United States Patent [19]
Hashimoto

[11] Patent Number: 5,357,824
[45] Date of Patent: Oct. 25, 1994

[54] INDUSTRIAL ROBOT

[75] Inventor: Yasuhiko Hashimoto, Kobe, Japan

[73] Assignee: Kawasaki Jukogyo Kabushiki Kaisha, Akashi, Japan

[21] Appl. No.: 972,085

[22] Filed: Nov. 5, 1992

Related U.S. Application Data

[63] Continuation of Ser. No. 634,462, Dec. 27, 1990, abandoned.

Foreign Application Priority Data

Dec. 28, 1989 [JP] Japan ................. 1-344385

[51] Int. Cl.$^5$ ............................... B25J 9/06
[52] U.S. Cl. ...................... 74/479 BP; 414/917; 901/23
[58] Field of Search ............. 74/479 BP; 414/4, 729, 414/917; 901/15, 23

[56] References Cited

U.S. PATENT DOCUMENTS

| | | | |
|---|---|---|---|
| 4,396,344 | 8/1983 | Sugimoto et al. | 414/917 X |
| 4,437,635 | 3/1984 | Pham | 74/479 X |
| 4,507,043 | 3/1985 | Flatau | 901/15 |
| 4,522,555 | 6/1985 | Inoue et al. | 74/479 X |
| 4,531,885 | 7/1985 | Molaug | 74/479 X |
| 4,627,786 | 12/1986 | Minematsu et al. | 74/479 X |
| 4,655,675 | 4/1987 | Yasuoka | 414/917 X |
| 4,725,178 | 2/1988 | Reis et al. | 414/4 |
| 4,776,230 | 10/1988 | Susnjara | 74/479 |
| 4,789,296 | 12/1988 | Bergman et al. | 414/917 X |
| 4,986,724 | 1/1991 | Steinmetz et al. | 414/729 |
| 4,991,456 | 2/1991 | Shibata et al. | 74/479 |
| 5,145,312 | 9/1992 | Sonoda et al. | 414/917 X |

FOREIGN PATENT DOCUMENTS

| | | | |
|---|---|---|---|
| 0184833 | 6/1986 | European Pat. Off. | |
| 2433954 | 1/1976 | Fed. Rep. of Germany | 901/15 |
| 2422482 | 11/1979 | France | |
| 2450673 | 10/1980 | France | |
| 60-255382 | 12/1985 | Japan | |
| 61-249287 | 11/1986 | Japan | |
| 837852 | 6/1981 | U.S.S.R. | 901/15 |
| 908589 | 2/1982 | U.S.S.R. | 901/15 |
| 941002 | 7/1982 | U.S.S.R. | 901/15 |
| 2061872 | 5/1981 | United Kingdom | |
| 2109337 | 6/1983 | United Kingdom | |

Primary Examiner—Allan D. Herrmann
Attorney, Agent, or Firm—Oliff & Berridge

[57] ABSTRACT

The industrial robot comprises two lower arms arranged parallel to each other and pivotably supported on a lower base member; an upper base member pivotably mounted on upper ends of these two lower arms, respectively so as to form a parallelogram together with the two lower arms; at least one first driving source for driving the parallelogrammic link; an upper arm pivotably supported on one side of the upper base member so as not to interfere with the parallelogrammic link and driven by a second driving source. Since the upper arm can be moved horizontally by inclination motion of the parallelogrammic link mechanism and further the upper arm is pivoted on one side of the upper base, the upper arm can be moved frontward, rearward and upward without any interference with the lower arms. Further, since a moment of the lower arm generated when a load is applied to the wrist of the upper arm is not subjected to the influence of the length and pivotal angle of the upper arm, the motor torque and reduction gear capacity for driving the lower arms can be reduced markedly.

22 Claims, 4 Drawing Sheets

INDUSTRIAL ROBOT

This is a continuation of application Ser. No. 07/634,462 filed Dec. 27, 1990, now abandoned.

BACKGROUND OF THE INVENTION

1. Field of the Invention

The present invention relates to an industrial robot, and more specifically to a multijoint link industrial robot improved in both operating space and load capacity.

2. Description of the Prior Art

The multijoint industrial robots can be classified into horizontal multijoint robots provided with joint members movable mainly in a horizontal plane and vertical multijoint robots provided with joint members movable in a vertical plane.

Figure 1:
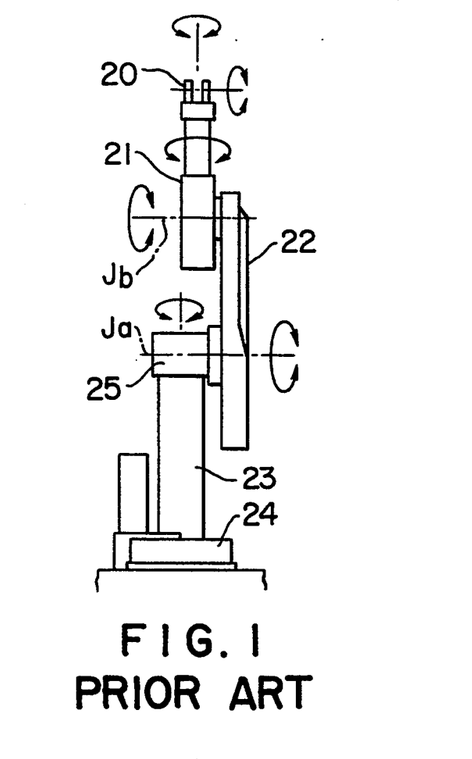
FIG. 1 is a diagrammatical front view showing a prior-art vertical multijoint robot.

In the case of the vertical multijoint robots, there are some whose operating space is limited due to interference of driven links with each other. In the case of a robot as shown in FIG. 1, however, since an upper arm member 21 having a wrist member 20 at an end thereof can be pivoted sufficiently upward and rearward, it is possible to increase the operating space. In other words, in the vertical multijoint robot as shown in FIG. 1, since the supporting member and the supported member are not interfered with each other in each of the pivotably constructed joint portions $J_a$ and $J_b$ (between a base member 24 and a rotary trunk member 23 or between a lower arm member 22 and an upper arm member 21), it is possible to increase the operating space.

Figure 2:
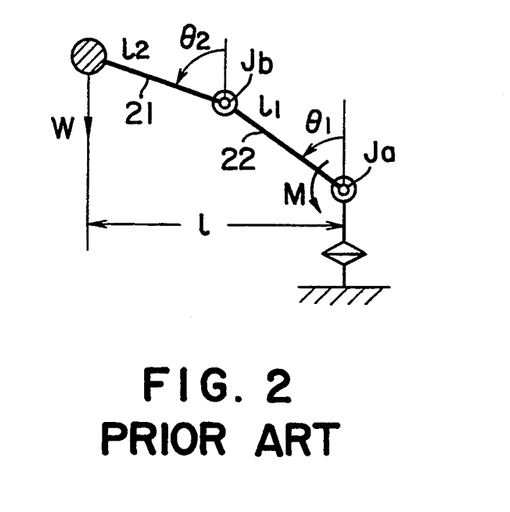
FIG. 2 is a force action diagram of the prior-art robot shown in FIG. 1.

In the vertical multijoint robot as shown in FIG. 1, however, when the lower arm 22 is pivoted, the upper arm 21 is pivoted together with the lower arm 22 and therefore, the load torque of a driving motor for pivoting the lower arm 22 greatly inevitably increases. In the case of a heavy load robot (which implies a robot which can handle heavy goods), in particular, when the lower arm 22 is pivoted to nearly a horizontal position, the load torque of the driving motor 25 for pivoting the lower arm 22 increases greatly. In more detail, with reference to a model diagram shown in 2, when a load of W kgf is applied to an end of the upper arm 21 (the arm length is $l_2$ and the pivotal angle is $\theta_2$), the moment M generated at the pivotal axis of the lower arm 22 (the arm length is $l_1$ and the pivotal angle is $\theta_1$) can be expressed as $$M = W \times (l_1 \sin\theta_1 + l_2 \sin\theta_2) = W \times l$$

Therefore, the load torque increases greatly in proportion to the horizontal distance l between the pivotal axis and the load (W) action line. Accordingly, it is practically impossible to adopt such a structure as described above to the heavy load robot.

On the other hand, in the case of the vertical multijoint robots, there are two types of direct acting robot (in which each arm is directly driven by each driving motor to increase the operating space) and a parallel link robot (in which the arm is driven by a parallel link mechanism from the arm side of the base to reduce the drive torque).

Figure 3A:
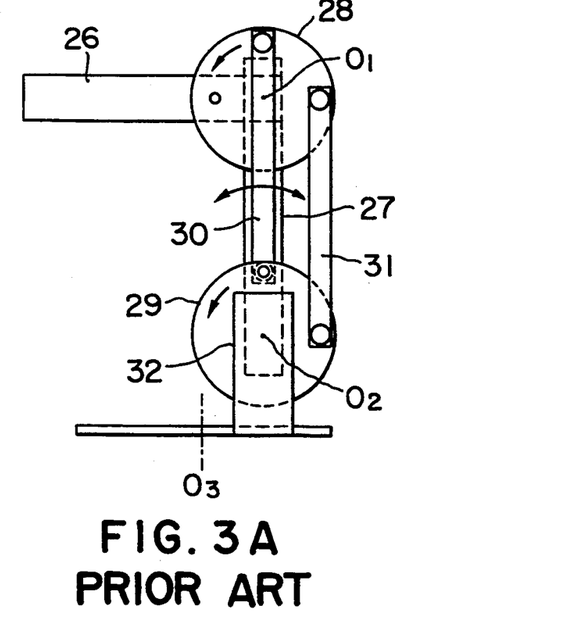
FIG. 3A is a diagrammatical right side view showing a prior-art parallel link robot.
Figure 3B:
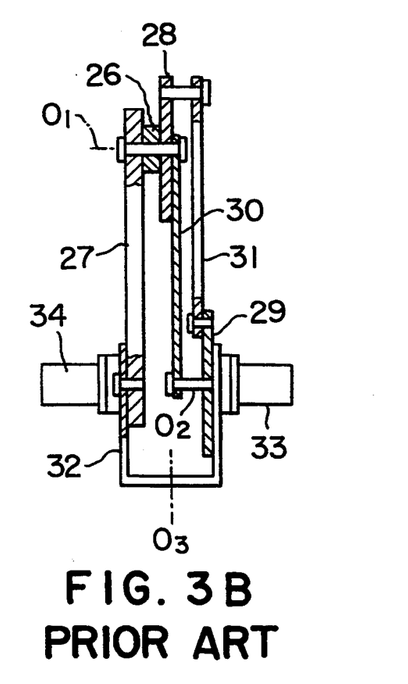
FIG. 3B is a partially cross-sectional, front view showing the same as shown in FIG. 3A.

In a conventional parallel link robot, however, there exist problems in that the links interfere with each other and further a dead point is easily produced in the parallel links, so that it has been difficult to increase the operating angle. To overcome these problems, Japanese Laid-open Patent (Kokai) No. 62-228385 (1987) discloses a robot as shown in FIGS. 3A and 3B, for instance, in which an upper arm 26 is pivotably supported by a lower arm 27; a driven rotary plate 28 is rotatably supported at the pivotal axis $O_1$ of the upper and lower arms 26 and 27; another driving rotary plate 29 is rotatably supported at the pivotal axis $O_2$ of the lower arm 27 and the rotary trunk 32 for supporting the lower arm 27; the two rotary plates 28 and 29 are connected via two links 30 and 31; and the upper arm 26 is moved or oscillated about the pivotal axis $O_1$ via the two links 30 and 31 when the driven rotary plate 29 is driven by a driving motor 33. Further, the lower arm 27 is driven by another driving motor 34 so as to be pivoted or inclined about the pivotal axis $O_2$.

In the case of the parallel link robot, however, there exist problems in that three links including the lower arm 27 are required and therefore the structure is complicated. In addition, since these links interfere with each other, the rearward movement of the arms is inevitably restricted. That is, when two rotary plates 28 and 29 rotate by a predetermined angle, the two links 30 and 31 are interfered with each other, with the result that the motion of the upper arm 26 is restricted. In practice, the upper arm 26 cannot pivot perfectly rearward. Therefore, when the operating space is changed from the front space to the rear space, the rotary trunk 32 must be pivoted relative to a base member (not shown). However, when the rotary trunk member 32 is rotated for rear side work as described above, there arises another problem in that a broad arm pivoting space is required around a single robot, because the lower arm 27, the upper arm 26 and the links 30 and 31 extending from the pivotal axis $O_3$ move within each operating space determined by each large locus or each large radius, respectively. In other words, when a great number of robots are arranged along an automotive vehicle assembly line, for instance, it is necessary to have a large space to install each robot.

SUMMARY OF THE INVENTION

With these problems in mind, therefore, it is the primary object of the present invention to provide an industrial robot which can simultaneously decrease both the operating space and increase the load capacity.

To achieve the above-mentioned object, an industrial robot according to the present invention comprises:
- a lower base member;
- first and second lower arms arranged parallel to each other and pivotably supported on said lower base member at each lower end thereof;
- an upper base member pivotably mounted on upper ends of said first and second lower arms, respectively so as to form a parallelogram along with said first and second lower arms;
- at least one first driving means for driving and inclining the parallelogrammic link formed by the upper and lower base members and the first and second lower arms;
- an upper arm pivotably supported on one side of said upper base member so as not to interfere with the parallelogrammic link; and a second driving means for driving said upper arm.

In the industrial robot according to the present invention, since the upper base member is translated (moved horizontally) by the inclination motion of quadrate links and additionally the upper arm can be pivoted on one side of the upper base member, the operation angle of the upper arm is not limited by interference between the links for driving the upper arm and further the upper arm can be pivoted not only frontward but also upward and rearward, being different from the case with the conventional robots.

In the conventional robot in which the upper and lower arms are driven by a parallel link mechanism, it has been impossible to sufficiently pivot the upper arm from above to below due to link interference. In the robot of the present invention, however, it is possible to pivot the upper arm sufficiently frontward, upward and rearward, so that a broad operating space can be realized. In other words, since the pivotal motion of the lower base can be minimized, it is possible to remarkably reduce the space between the two adjacent robots according to the present invention. Further, since the operating locus of the robot arm required for various work can be reduced markedly, it is possible to improve the robot workability.

Further, when a heavy load is applied to the wrist of the upper arm end, since the moment generated about the pivotal axis of the lower arm is not subjected to the influence of the length and the pivotal angle of the upper arm; that is, since the moment generated about the upper arm will not be transmitted to the lower arm as a moment to pivot the lower arm (transmitted to the lower arm ends only as load), it is possible to markedly reduce the capacity of the reduction gear and the motor torque for driving the lower arms.

As described above, the present invention provides an economical industrial robot provided with both the features of the direct acting robot and the link robot, which can grip and move not only light goods but also heavy goods within a broad operating space.

BRIEF DESCRIPTION OF THE DRAWINGS

In the attached drawings.

DETAILED DESCRIPTION OF THE PREFERRED EMBODIMENT

An embodiment of the present invention will be described hereinbelow with reference to the attached drawings.

Figure 4:
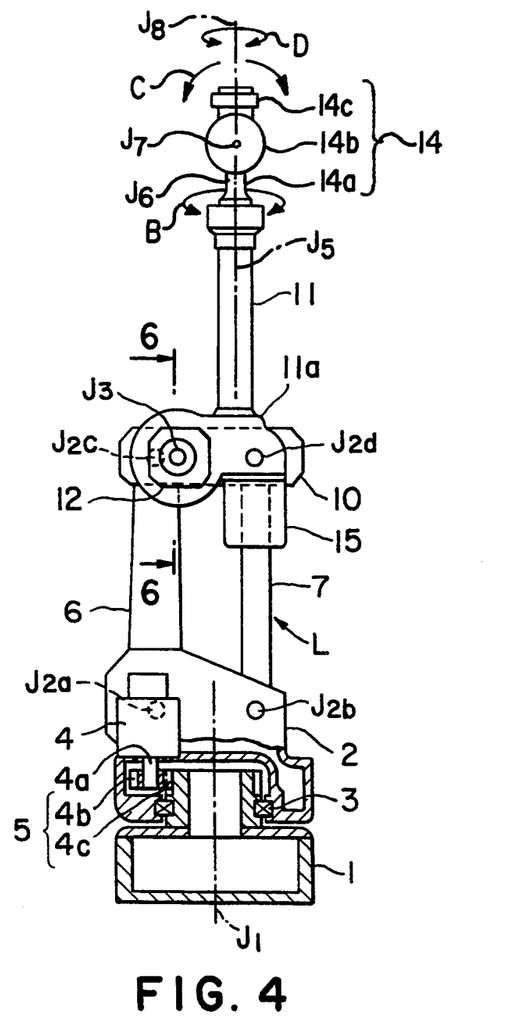
FIG. 4 is a diagrammatical right side view showing an embodiment of the industrial robot according to the present invention.
Figure 5:
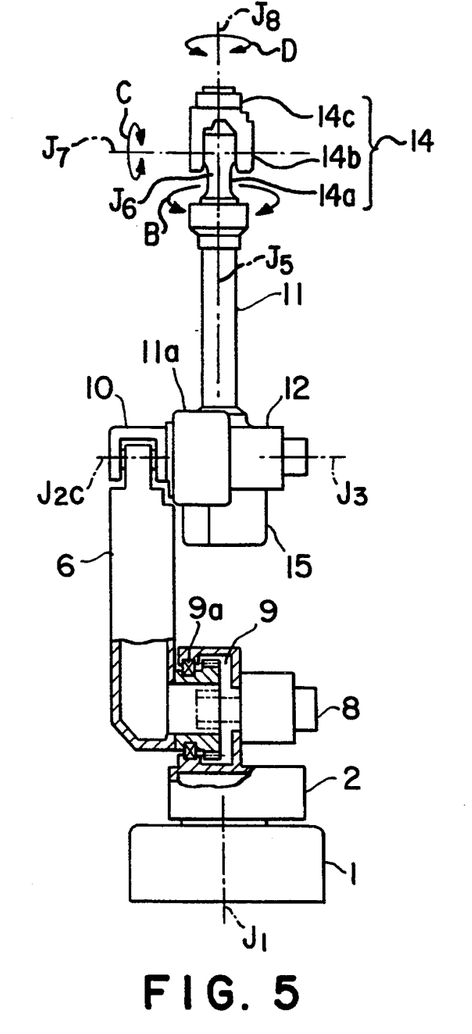
FIG. 5 is a front view showing the same as shown in FIG. 4.

FIG. 4 is a right side view showing the embodiment of the industrial robot according to the present invention, and FIG. 5 is a front view thereof.

In FIGS. 4 and 5, a rotary base (lower base member) 2 is supported on a fixed base 1 via a bearing 3 so as to be pivotable around a pivotal axis $J_1$ and driven by a driving motor (i.e. actuator) 4 and through a reduction gear 5 both mounted on the rotary base 2. The reduction gear 5 is composed of a small-diameter gear 4b fixed to a shaft 4a of the driving motor 4 and a large-diameter gear 4c supported on the fixed base 1 in mesh with the small-diameter gear 4b as shown in FIGS. 4 and 5, for instance.

A first lower arm 6 and a second lower arm 7 are pivotably supported in parallel to each other by the rotary base (lower base member) 2. That is, the lower ends of the first and second lower arms 6 and 7 are pivotably supported about two horizontal pivotal axes $J_{2a}$ and $J_{2b}$, respectively, and further only the first lower arm 6 is pivotably driven by the driving motor 8 and through the reduction gear 9 mounted on the rotary base 2 via a bearing 9a. Further, the upper ends of the first and second lower arms 6 and 7 are supported by a U-shaped section upper base member 10 so as to be pivotable about pivotal axes $J_{2c}$ and $J_{2d}$, respectively.

Figure 7:
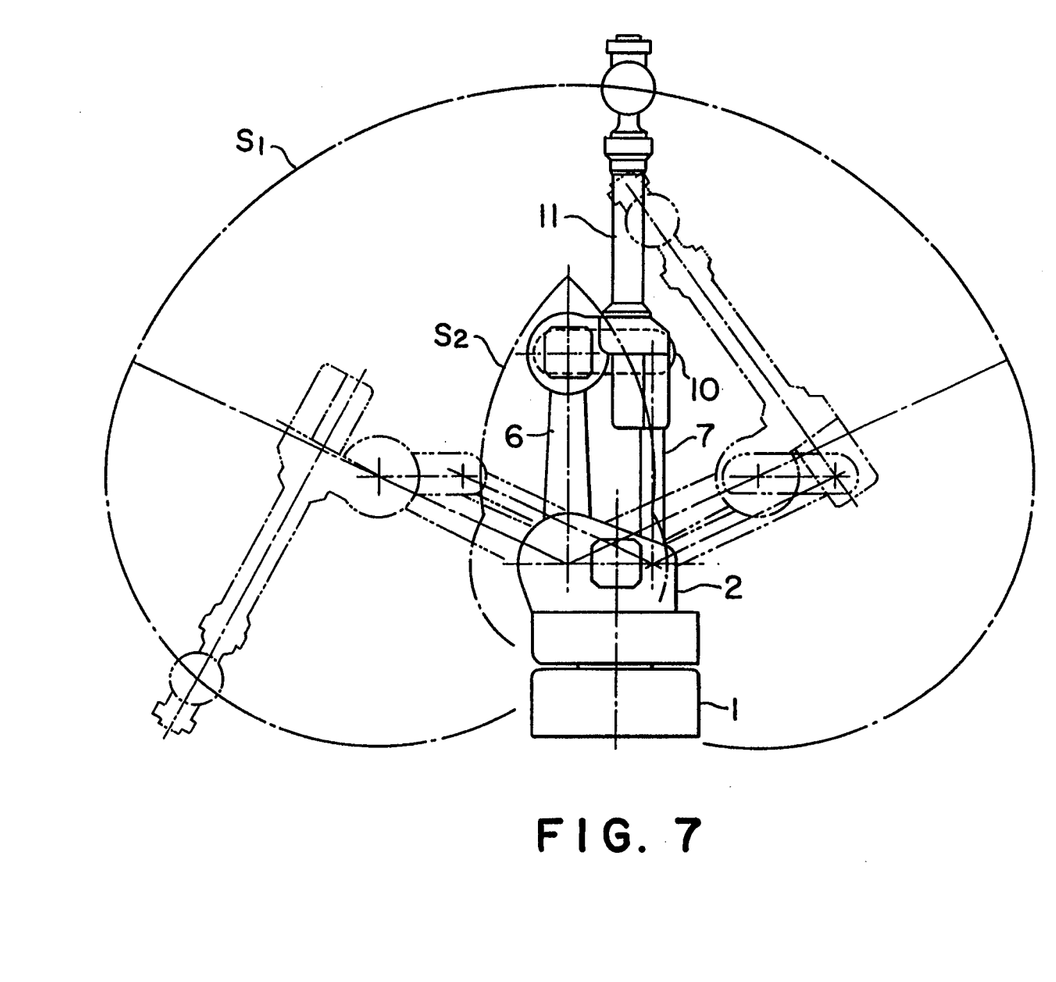
FIG. 7 is an operation diagram for assistance in explaining the operation of the industrial robot according to the present invention.

Therefore, a quadrate link (parallelogrammic link in this embodiment) can be formed by the rotary base (lower base member) 2, the first lower arm 6, the second lower arm 7, and the upper base 10. The parallelogrammic link L can be inclined to translate the upper base member 10 horizontally frontward or rearward as shown in FIG. 7, when the first lower arm 6 is driven or pivoted about the horizontal pivotal axis $J_{2a}$ by the driving motor 8 and the reduction gear 9 both mounted on the rotary base 2. Further, in this embodiment, the same translation movement can be obtained by driving the second lower arm 7, instead of driving the first lower arm 6. Further, it is also possible to drive the first and second lower arms 6 and 7 simultaneously by a single or two actuators (i.e. driving sources) in synchronism with each other.

Figure 6:
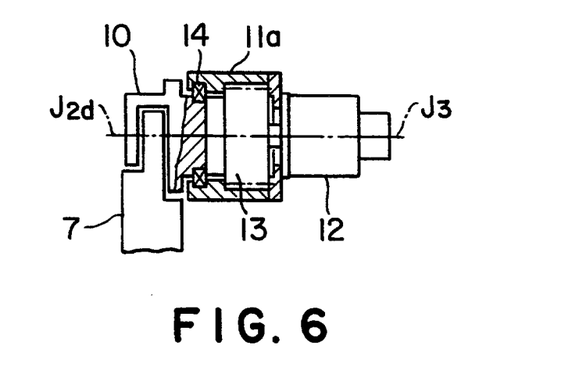
FIG. 6 is a cross-sectional view taken along the line 6—6 show in FIG. 4.

On the other hand, as shown in FIG. 5 and FIG. 6 (cross-sectional view taken along line 6—6 in FIG. 4), a base portion 11a of an upper arm 11 is supported by a bearing 14 on one side of the upper base member 10 so as to be pivotable about a pivotal axis $J_3$. Therefore, the upper arm 11 can be pivoted in a plane different from the pivotal (inclination motion) plane of the parallelogrammic link L, so that when the upper arm 11 is pivoted, the first and second arms 6 and 7 will not be interfered by the upper arm 11. Further, since the upper arm 11 is a so-called direct acting arm, the upper arm 11 is directly driven or pivoted relative to the upper base by another driving motor 12 (actuator or driving source) and a reduction gear 13 mounted on the base portion 11a of the upper arm 11. However, it is also possible to mount the driving source directly on the upper base member 10. Further, a wrist 14 is attached to an end of the upper arm 11 so as to be driven by a wrist driving mechanism 15 mounted on the base portion 11a of the upper arm 11. The wrist 14 is provided with a coupling member 14a, a supporting member 14b and an end portion 14c. The supporting member 14b is connected to the upper arm 11 by the coupling member 14a. The end portion 14c is supported by the supporting member 14b to handle goods. The coupling member 14a is pivotal in a direction depicted by an arrow B about a pivotal axis J$_6$ which is an extension of a center line J$_5$ of the upper arm. The supporting member 14b is swingable about an axis J$_7$ in a direction depicted by an arrow C. Further, the end portion 14c is pivotal about a pivotal axis J$_8$ in a direction depicted by an arrow D.

Further, in this embodiment, although the horizontal pivotal axis J$_3$ of the upper base member 10 about which the upper arm 11 is pivoted is a little offset from the horizontal pivotal axis J$_{2c}$ of the upper base member 10 about which the first lower arm 6 is pivoted it is also possible to align these two horizontal pivotal axes with each other.

FIG. 7 shows an operating space of the robot constructed as described above, in which the horizontal pivotal axis J$_3$ and the horizontal pivotal axis J$_{2c}$ are aligned with each other and further the rotary base (lower base) is assumed to be fixed. In FIG. 7, a range enclosed by an outer curve S$_1$ and an inner curve S$_2$ is a vertical operating space. FIG. 7 indicates that the operating space can be increased upward and rearward, as compared with the conventional link robot. Therefore, it is possible to obtain a broad rearward working area without pivoting the rotary base (lower base member).

Figure 8:
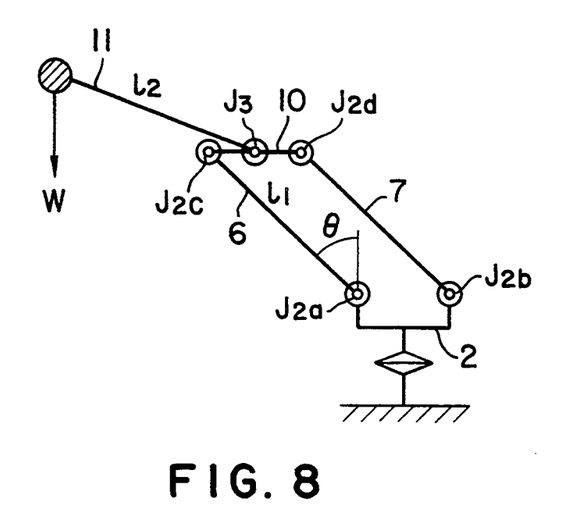
FIG. 8 is a skeletal diagram expressing moving functions of the industrial robot according to the present invention.

The feature that the robot of the present invention can be preferably used for heavy load goods will be verified by the following calculation with reference to a skeletal diagram shown in FIG. 8.

Here, a moment M generated about the horizontal pivotal axis J$_{2a}$ of the lower arm 6 will be calculated, when the lower arm 6 of the quadrate link L is pivoted by an angle $\theta$ and where a length of the first arm 6 is denoted as l$_1$; a length of the upper arm 11 is denoted as l$_2$; and a load applied to the wrist of the upper arm 11 is denoted as W kgf.

Figure 9A:
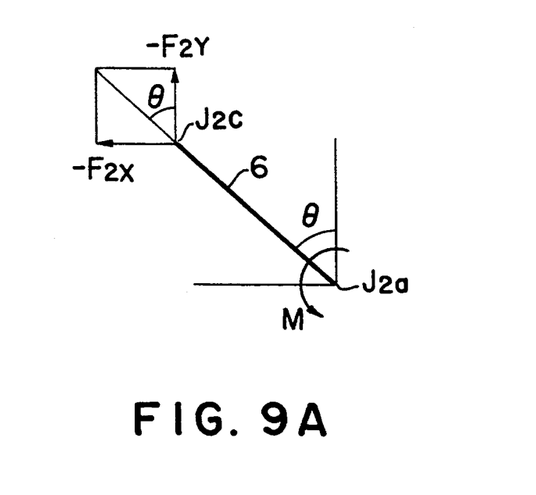
FIG. 9A is a diagram showing force and moment which act to the first lower arm 6.
Figure 9B:
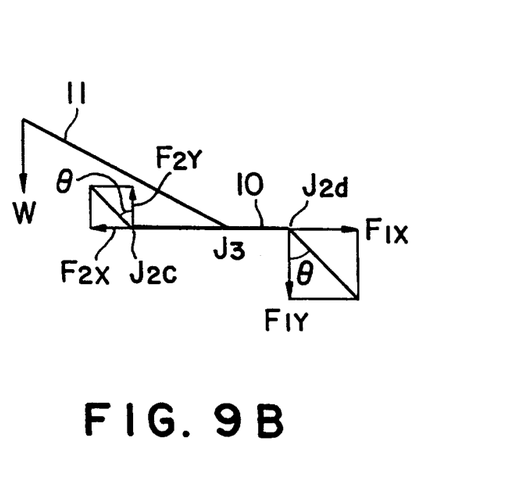
FIG. 9B is a diagram showing force and moment which act to the combination of the upper base member 10 and the upper arm 11.

As shown in FIG. 9B, in the case of the upper arm 11 and the upper base member 10, the following formulae can be obtained on the basis of force balances:

$$F_{2x} = F_{1x} \quad (1)$$

$$F_{2y} = F_{1y} + W \quad (2)$$

$$F_{1x} = F_{1y} + \tan\theta \quad (3)$$

where F$_{2x}$ and F$_{1x}$ denote horizontal components of the forces applied to the horizontal pivotal axes J$_{2c}$ and J$_{2d}$ of the upper base member 10, respectively; and F$_{2y}$ and F$_{1y}$ denote the vertical components thereof.

As shown in FIG. 9A, in the case of the first lower arm 6, a moment generated about the lower horizontal pivotal axis J$_{2a}$ of the lower arm 6 can be expressed as $$M = F_{2y} \times l_1 \times \sin\theta - F_{2x} \times l_1 \times \cos\theta \quad (4)$$

By substituting the above formulae (1) to (3) for (4), the following formula can be obtained as $$M = [(F_{1y} + W) \times \sin\theta - F_{1y} \times \tan\theta \times \cos\theta] \times l_1 = W \times l_1 \times \sin\theta$$

Therefore, in the case of the robot according to the present invention, the moment M generated about the horizontal pivotal axis at the lower end of the lower arm 6 due to the load W applied to the upper end of the upper arm 11 is not subjected to the influence of the length l$_2$ and the pivotal angle of the upper arm 11, as indicated by the above formula (4). In other words, the moment of the upper arm 11 is not transmitted to the lower arms 6 and 7 as moment to pivot these lower arms, but instead is transmitted to the lower ends of these lower arms 6 and 7 as gravity load. It should be noted that the above-mentioned feature is not obtained in the prior-art vertical multijoint robot (as shown in FIG. 2), because the horizontal distance between the load action point of the upper arm and the pivotal axis of the driving portion at the lower end of the lower arm becomes an arm (or lever) length of moment generated about the pivotal axis of the base in relation to the lengths of the upper and lower arms. In the present invention, however, since a parallelogrammic link mechanism is adopted, it is possible to provide the above-mentioned effect for the robot. Therefore, the driving motor power can be reduced markedly and therefore the robot is suitable for use as industrial heavy load robots, in particular.

What is claimed is:

1. An industrial robot, comprising:

a lower base member;

a first driving motor for driving said lower base member to pivot about a first axis, said first driving motor being provided on said lower base member so that said first driving motor is displaced from the first axis;

first and second lower arms arranged parallel to each other and having lower ends which are pivotally supported on end portions of said lower base member;

said first driving motor and said first and second lower arms being provided on a first side of said robot with respect to the first axis;

an upper base member pivotally mounted on upper ends of said first and second lower arms and having a connecting portion extending at least between the upper ends of said first and second lower arms, said connecting portion located substantially in a common plane with said first and second lower arms;

said lower base member, said first and second lower arms and said upper base member defining a parallelogram;

at least one second driving motor for driving and inclining at least one of said first and second lower arms about their respective second axes, said second driving motor being provided on a second side of said robot which is opposite to the first side with respect to the first axis and said first and second driving motors being provided apart so as not to interfere with each other;

an upper arm pivotally supported on one side of said connecting portion of said upper base member so that said upper arm pivots relative to said upper base member about a third axis which is parallel to said second axes about which said first and second lower arms pivot with respect to said upper and lower base members, and so that said upper arm is pivotal in a plane parallel to and different from said common plane containing said first and second lower arms and said upper base member so as not to interfere with said upper base member and said first and second lower arms when said upper arm rotates; and a third driving motor for driving said upper arm to pivot about the third axis by which said upper arm is pivotally attached to said upper base member.

2. The industrial robot according to claim 1, wherein said third axis about which said upper arm pivots relative to said upper base member, and said second axes about which said first and second lower arms pivot relative to said upper and lower base members are horizontal axes.

3. The industrial robot according to claim 1, wherein said lower base member is rotatably supported to a fixed base.

4. The industrial robot according to claim 1, wherein said third driving motor is provided on said upper arm.

5. The industrial robot according to claim 1, wherein said third driving motor is provided on said upper base member.

6. The industrial robot according to claim 1, wherein said lower base member is offset from said common plane containing said first and second lower arms and said upper base member, said first axis is perpendicular to said third axis, and said first axis is contained in a plane which is substantially the same as a plane in which said upper arm moves when said upper arm is driven by said third driving motor.

7. The industrial robot according to claim 1, wherein said third axis about which said upper arm rotates relative to said upper base member is at least as vertically high as a plane containing pivotal axes where said upper ends of said first and second lower arms are pivotally mounted to said upper base member.

8. The industrial robot of claim 1, wherein the upper end of said first lower arm is pivotally attached to a front end of said upper base member, the upper end of said second lower arm is pivotally attached to a rear end of said upper base member, and a base portion of said upper arm is pivotally attached to said one side of said upper base member so that a working end of said upper arm, located opposite from said base portion of said upper arm, can be positioned forward of, above, and rearward of said upper base member when said upper arm is pivoted by said third driving motor.

9. The industrial robot according to claim 8, further comprising:
a wrist pivotally attached to the working end of said upper arm; and
a wrist driving motor for driving said wrist.

10. The industrial robot according to claim 8, wherein said base portion of said upper arm is pivotally attached to said upper base member at a portion of said upper base member located between where said upper ends of said first and second lower arms are pivotally mounted to said upper base member.

11. The industrial robot according to claim 8, wherein said base portion of said upper arm is pivotally attached to said upper base member at a same portion of said upper base member as where the upper end of said first lower arm is pivotally attached to said upper base member.

12. The industrial robot according to claim 1, further comprising:
a wrist pivotally attached to said upper arm; and
a wrist driving motor for driving said wrist.

13. The industrial robot according to claim 1, wherein said upper arm is pivotally attached to said upper base member at a portion of said upper base member located between where said upper ends of said first and second lower arms are pivotally mounted to said upper base member.

14. The industrial robot according to claim 1, wherein said upper arm is pivotally attached to said upper base member at a same portion of said upper base member as where the upper end of said first lower arm is pivotally attached to said upper base member.

15. An industrial robot, comprising:
a lower base member;
a first driving motor for driving said lower base member to pivot about a first axis, said first driving motor being provided on said lower base member so that said first driving motor is displaced from the first axis;
first and second lower arms arranged parallel to each other and pivotally supported on end portions of said lower base member at each lower end thereof;
said first driving motor and said first and second lower arms being provided on a first side of said robot with respect to the first axis;
an upper base member pivotally mounted on upper ends of said first and second lower arms;
said lower base member, said first and second lower arms and said upper base member defining a parallelogram;
at least one second driving motor for driving and inclining at least one of said first and second lower arms about their respective second axes, said second driving motor being provided on a second side of said robot which is opposite to the first side with respect to the first axis and said first and second driving motors being provided apart so as not to interfere with each other;
an upper arm pivotally supported on one side of said upper base member so as not to interfere with said upper base member and said first and second lower arms when said upper arm rotates, said upper arm being pivotally attached to said upper base member at a same portion of said upper base member as where the upper end of said first lower arm is pivotally attached to said upper base member so that the upper end of said first lower arm and said upper arm pivot about a common axis; and
a third driving motor for driving said upper arm.

16. The industrial robot according to claim 15, wherein said lower base member is offset from a plane containing said first and second lower arms and from a plane containing said upper base member, said first axis is perpendicular to said common axis about which said upper arm pivots relative to said upper base member, said first axis being contained in a plane which is substantially the same as a plane in which said upper arm moves when said upper arm is driven by said third driving motor.

17. The industrial robot according to claim 15, wherein said upper base member includes a connecting portion extending between the upper ends of said first and second lower arms and located substantially entirely in a common plane with said first and second lower arms, said upper arm is pivotally attached to said connecting portion so that said common axis about which said upper arm pivots is parallel to axes about which said first and second lower arms pivot with respect to said upper and lower base members, and so that said upper arm is pivotal in a plane parallel to and different from said common plane containing said first and second lower arms and said upper base member so as not to interfere with said upper base member and said first and second lower arms when said upper arm rotates.

18. An industrial robot, comprising:
a lower base member;
a first driving motor for driving said lower base member to pivot about a first axis, said first driving motor being provided on said lower base member so that said first driving motor is displaced from the first axis;
first and second lower arms arranged parallel to each other, each of said first and second lower arms having an upper end and a lower end, said lower ends of said first and second lower arms pivotally attached to said lower base member;
said first driving motor and said first and second lower arms being provided on a first side of said robot with respect to the first axis;
an upper base member pivotally attached to said upper ends of said first and second lower arms, extending at least between the upper ends of said first and second lower arms, and located in a common plane with said first and second lower arms;
at least one second driving motor for driving and inclining at least one of said first and second lower arms about their respective second axes, said second driving motor being provided on a second side of said robot which is opposite to the first side with respect to the first axis and said first and second driving motors being provided apart so as not to interfere with each other;
an upper arm pivotally supported on one side of said upper base member so that said upper arm is pivotal relative to said upper base member in a plane parallel to and different from said common plane containing said first and second lower arms and said upper base member so as not to interfere with said first and second lower arms and said upper base member when said upper arm pivots;
said lower base member offset from said common plane containing said first and second lower arms and said upper base member, said first axis being perpendicular to a third axis about which said upper arm pivots relative to said upper base member; and
a third driving motor for driving said upper arm to pivot about the third axis by which said upper arm is pivotally attached to said upper base member, said first axis of said lower base member being contained in a plane which is substantially the same as a plane in which said upper arm moves when said upper arm is driven by said third driving motor.

19. The industrial robot according to claim 18, wherein the third axis about which said upper arm rotates relative to said upper base member is at least as vertically high as a plane containing pivotal axes where said upper ends of said first and second lower arms are pivotally attached to said upper base member.

20. An industrial robot, comprising:
a lower base member;
a first driving motor for driving said lower base member to pivot about a first axis, said first driving motor being provided on said lower base member so that said first driving motor is displaced from the first axis;
first and second lower arms arranged parallel to each other and having lower ends which are pivotally supported on end portions of said lower base member;
said first driving motor and said first and second lower arms being provided on a first side of said robot with respect to the first axis;
an upper base member pivotally mounted on upper ends of said first and second lower arms and having a connecting portion extending at least between the upper ends of said first and second lower arms and located substantially in a common plane with said first and second lower arms;
at least one second driving motor for driving and inclining at least one of said first and second lower arms about their respective second axes, said second driving motor being provided on a second side of said robot which is opposite to the first side with respect to the first axis and said first and second driving motors being provided apart so as not to interfere with each other;
an upper arm pivotally supported on one side of said connecting portion of said upper base member so that a third axis about which said upper arm rotates relative to said upper base member is at least as vertically high as a plane containing the second axes where said upper ends of said first and second lower arms are pivotally mounted to said upper base member, said third axis being parallel to said second axes about which said first and second lower arms pivot with respect to said upper and lower base members, said upper arm being pivotal in a plane parallel to and different from said common plane containing said first and second lower arms and said upper base member so as not to interfere with said upper base member and said first and second lower arms when said upper arm rotates;
said lower base member offset from said common plane containing said first and second lower arms and said upper base member, said first rotational axis being perpendicular to said third axis; and
a third driving motor for driving said upper arm to pivot about said third axis by which said upper arm is pivotally attached to said upper base member, said first axis of said lower base member being contained in a plane which is substantially the same as a plane in which said upper arm moves when said upper arm is driven by said third driving motor.

21. An industrial robot, comprising:
a lower base member;
a first driving motor for driving said lower base member to pivot about a first axis, said first driving motor being provided on said lower base member so that said first driving motor is displaced from the first axis;
first and second lower arms arranged parallel to each other and having lower ends which are pivotally supported on end portions of said lower base member;
said first driving motor and said first and second lower arms being provided on a first side of the robot with respect to the first axis;
an upper base member pivotally mounted on upper ends of said first and second lower arms and having a connecting portion extending at least between the upper ends of said first and second lower arms, said connecting portion located substantially in a common plane with said first and second lower arms;

said lower base member, said first and second lower arms and said upper base member defining a parallelogram;

at least one second driving motor for driving and inclining at least one of said first and second lower arms about their respective second axes, said second driving motor being provided on a second side of said robot which is opposite to the first side with respect to the first axis and said first and second driving motors being provided apart so as not to interfere with each other;

an upper arm pivotally supported on one side of said connecting portion of said upper base member so that said upper arm pivots relative to said upper base member about a third axis which is parallel to said second axes about which said first and second lower arms pivot with respect to said upper and lower base members, and so that said upper arm is pivotal in a plane in which the first axis is located, said plane being parallel to and different from said common plane containing said first and second lower arms and said upper base member so as not to interfere with said upper base member and said first and second lower arms when said upper arm rotates; and a third driving motor for driving said upper arm to pivot about the third axis by which said upper arm is pivotally attached to said upper base member.

22. The industrial robot according to claim 21, further comprising:

a wrist having a coupling member by which said wrist is pivotally coupled to said upper arm and an end portion for handling an object, wherein said coupling member is pivotal about a fourth axis which is an extension of a center line passing through said upper arm in a longitudinal direction thereof and said end portion is pivotal about a fifth axis which at least intersects said third axis.

* * * * *